United States Patent
Kim

(10) Patent No.: US 8,827,353 B2
(45) Date of Patent: Sep. 9, 2014

(54) FRONT BODY STRUCTURE OF VEHICLE

(71) Applicant: Hyundai Motor Company, Seoul (KR)

(72) Inventor: Hyun Gyung Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/714,970

(22) Filed: Dec. 14, 2012

(65) Prior Publication Data

US 2014/0117684 A1    May 1, 2014

(30) Foreign Application Priority Data

Oct. 31, 2012  (KR) .................. 10-2012-0121975

(51) Int. Cl.
*B60R 19/20*  (2006.01)
*B60R 21/36*  (2011.01)

(52) U.S. Cl.
CPC ..................... *B60R 21/36* (2013.01)
USPC ...................... 296/187.04; 293/107; 293/102

(58) Field of Classification Search
USPC .............. 296/187.04; 293/107, 127, 102, 148
See application file for complete search history.

(56) References Cited

U.S. PATENT DOCUMENTS 3,656,791 A * 4/1972 Truesdell ................... 293/107
5,725,265 A * 3/1998 Baber ....................... 293/107

FOREIGN PATENT DOCUMENTS

| CN | 201023455 | * | 2/2008 |
|---|---|---|---|
| JP | 2005-153750 A | | 6/2005 |
| JP | 2010-132255 | * | 6/2010 |
| JP | 2012-240666 | * | 12/2012 |
| KR | 10-1047561 B1 | | 7/2011 |
| KR | 10-1198600 B1 | | 11/2012 |

* cited by examiner

*Primary Examiner* — Dennis H Pedder
(74) *Attorney, Agent, or Firm* — Morgan, Lewis & Bockius LLP

(57) ABSTRACT

A front body structure of a vehicle in which rigidity of a back beam may be significantly improved through being coupled with an energy absorber, an airbag cushion is extended to protrude forward while tearing only a front bumper, and the energy absorber is made of steel in order to improve rigidity.

6 Claims, 4 Drawing Sheets

FRONT BODY STRUCTURE OF VEHICLE

CROSS-REFERENCE TO RELATED APPLICATION

The present application claims priority of Korean Patent Application Number 10-2012-0121975 filed Oct. 31, 2012, the entire contents of which application is incorporated herein for all purposes by this reference.

BACKGROUND OF INVENTION

1. Field of Invention

The present invention relates to a front body structure of a vehicle, and more particularly, to a front body structure of a vehicle in which a front energy absorber is installed.

2. Description of Related Art

In general, as a countermeasure for protecting a vehicle body and furthermore, protecting passengers against a collision accident, an energy absorber 4 having an exterior airbag 4 is installed in front of a vehicle as illustrated in FIGS. 1 and 2.

That is, a front body structure of a vehicle in the related art has a structure in which an exterior airbag 2 is fixedly installed on a back beam 1 through a coupling member 3 so that the exterior airbag 2 is positioned in front of the back beam 1 and an energy absorber 4 is installed in front of the exterior airbag 2, however, a C-type cross-sectional structure in which a front side of the energy absorber 4 is sealed and a rear side of the energy absorber 4 is opened is formed, and as a result, both upper lower ends are fixedly coupled to the back beam 1 to cover the exterior airbag 2 so as to prevent the exterior airbag 2 from being exposed to the front side.

In addition, a front bumper 5 is installed in front of the exterior airbag 2.

The exterior airbag 2 includes an inflator 2a and an airbag cushion 2b.

However, the front body structure in the related art has a structure the coupling member 3 such as a bolt or a screw is fastened through the back beam 1 in order to install the exterior airbag 2, and as a result, rigidity of the back beam 1 deteriorates, thereby reducing a low-speed collision performance.

Further, in the structure in the related art, when the exterior airbag 2 is actuated, the airbag cushion 2b is extended to protrude forward while tearing the energy absorber 4 and the front bumper 5.

Accordingly, since the airbag cushion 2b needs to be extended by tearing two structures, that is, the energy absorber 4 and the front bumper 5, extension performance of the airbag cushion 2b is reduced and since the inflator 2a which is a large capacity needs to be used in order to remedy a disadvantage, another problem in which a weight is increased and a cost is increased occurs in this case.

Further, in the structure in the related art, since the airbag cushion 2b needs to be extended after tearing the energy absorber 4, the energy absorber 4 is made of not a material which has large rigidity but a plastic material which may be easily torn, and as a result, the rigidity of the energy absorber 4 is low and the energy absorber 4 cannot sufficiently absorb collision energy while being easily collapsed when an accident occurs.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a front body structure of a vehicle that improve a low-speed collision performance by improving rigidity of a back beam, can improve extension performance of an airbag cushion by allowing the airbag cushion to be extended by tearing only a front bumper, and can sufficiently absorb collision energy when an accident occurs through increasing rigidity of an energy absorber.

Various aspects of the present invention provide for a front body structure of a vehicle including: an energy absorber formed by a cross section of which a front side is opened and a rear side is sealed, and installed with the sealed rear side coupled to a back beam and the opened front side which protrudes forward; an exterior airbag fixedly installed by being coupled with the energy absorber with being inserted into the energy absorber; and a front bumper coupled with the exterior airbag while being positioned in front of the exterior airbag to cover an opened front side of the exterior airbag.

The front body structure of a vehicle may further include a plurality of mounting brackets coupled to left and right sides of the back beam to protrude downward, and a lower stiffener installed horizontally to connect the mounting bracket to protect a walker.

The back beam may be a tubular back beam including two horizontal bars vertically spaced apart from each other and a plurality of vertical bars connecting two horizontal bars.

The energy absorber may be made of steel in order to promote rigidity.

The energy absorber may include: a rear sealed portion installed to penetrate to a rear side from a front side between two horizontal bars and having the inflator and the airbag cushion fixed to the an internal space; an extended portion bent to the outside from an end of a front side of the rear sealed portion; and a front extended portion bent to a front side from the end of the extended portion and coupled with the front bumper, and serving as a guide when the airbag cushion is extended.

The horizontal bar of the back beam may be welded to a connection portion of the rear sealed portion and the extended portion.

A plurality of coupling holes may be formed at an end of a front opening portion, and a plurality of hook protrusions that are fixed with being hung on the front opening portion by penetrating the coupling holes, respectively may integrally protrude on an inner surface of the front bumper.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
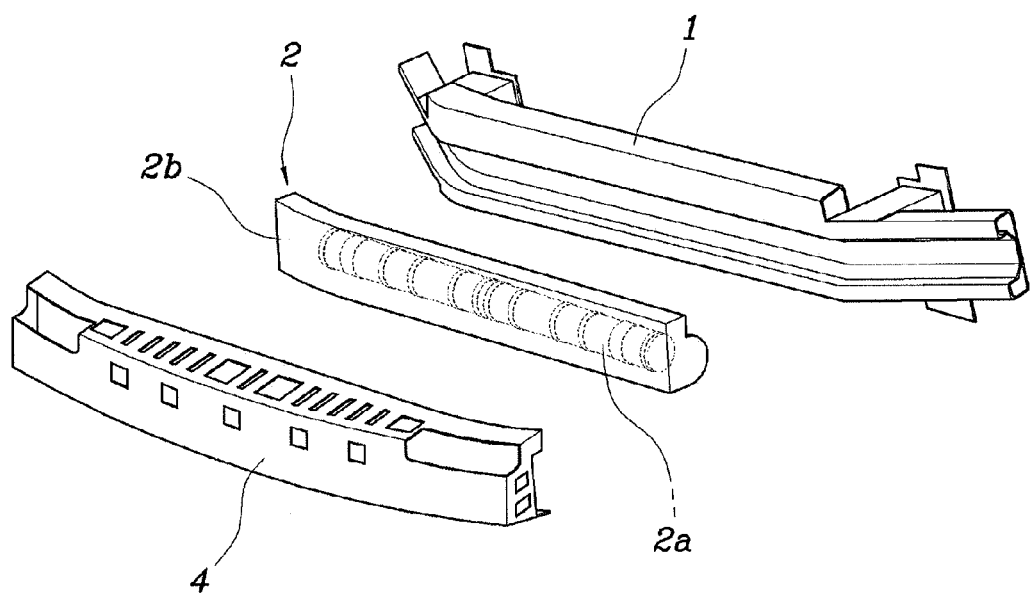
FIG. 1 is an exploded perspective view of a front body structure of a vehicle in the related art.
Figure 2:
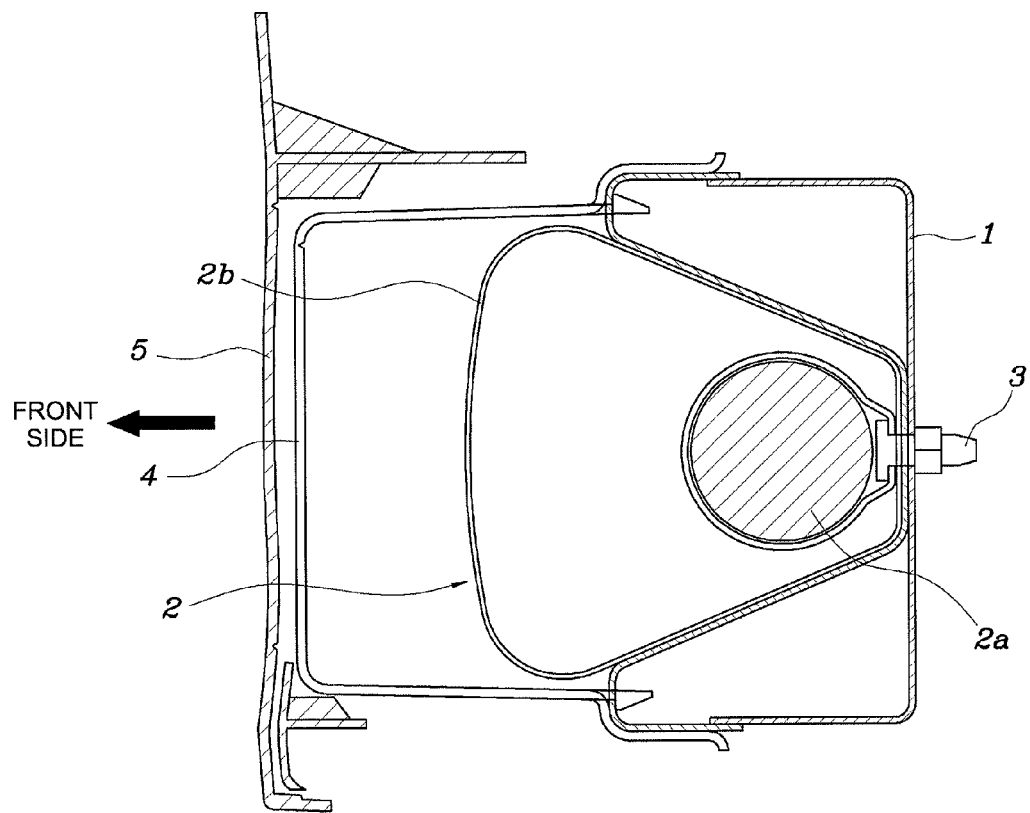
FIG. 2 is a coupling cross-sectional view of FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, a front body structure of a vehicle according to various embodiments of the present invention will be described with reference to the accompanying drawings.

Figure 3:
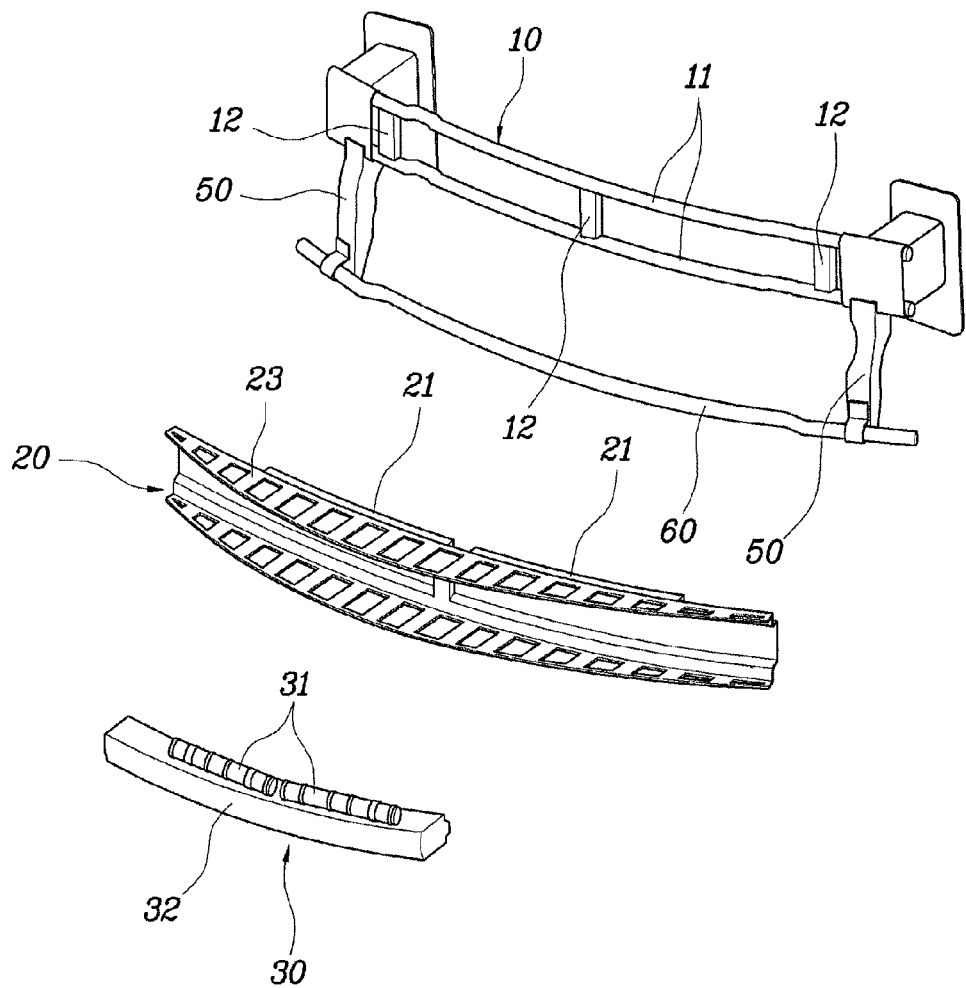
FIG. 3 is an exploded perspective view of an exemplary front body structure of a vehicle according to the present invention.
Figure 4:
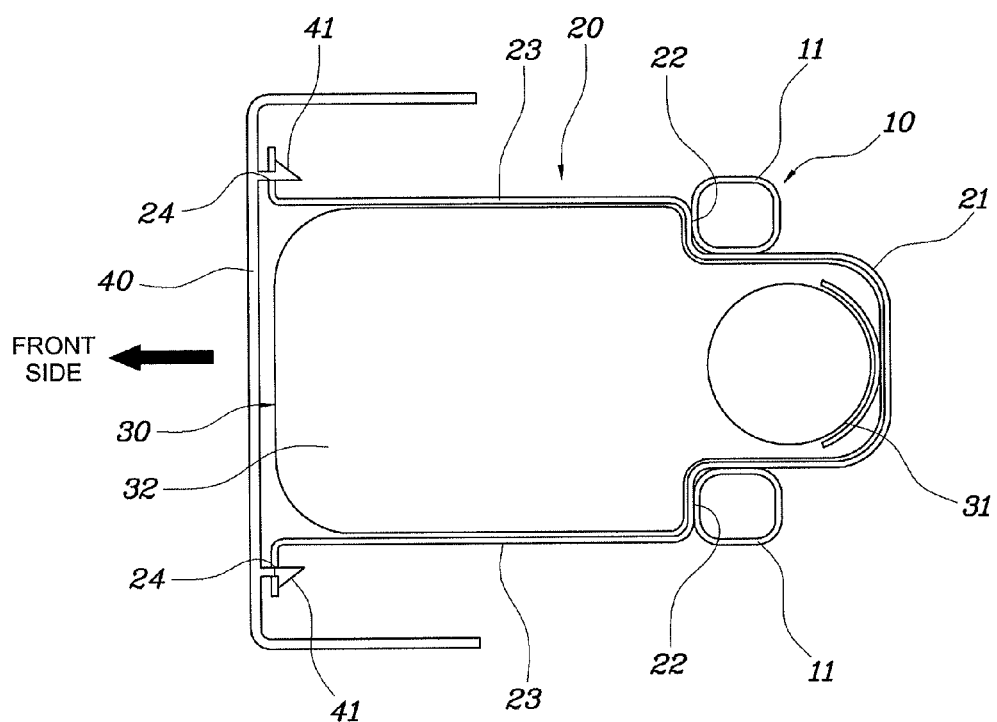
FIG. 4 is a coupling cross-sectional view of FIG. 3.

A front body structure of a vehicle according to the present invention includes an energy absorber 20 formed by a cross section of which a front side is opened and a rear side is sealed, and installed with the sealed rear side coupled to a back beam 10 and the opened front side which protrudes forward; an exterior airbag 30 fixedly installed by being coupled with the energy absorber 20 with being inserted into the energy absorber 20; a front bumper 40 coupled with the exterior airbag 30 while being positioned in front of the exterior airbag 30 to cover an opened front side of the exterior airbag 30; a plurality of mounting brackets 50 coupled to left and right sides of the back beam 10 to protrude downward; and a lower stiffener 60 installed horizontally to connect the mounting bracket 50 to protect a walker, as illustrated in FIGS. 3 and 4.

The back beam 10 is a tubular back beam including two horizontal bars 11 vertically spaced apart from each other and installed horizontally and a plurality of vertical bars 12 connecting two horizontal bars 11.

Herein, a cross section of the horizontal bar 11 has a rectangular shape, a circular shape, or an oval shape and as necessary, a rear side of the horizontal bar 11 may be formed even by an opened C-shaped cross section.

The exterior airbag 30 includes an inflator 31 generating airbag gas and an airbag cushion 32 extended by pressure of airbag gas.

The energy absorber 20 includes a rear sealed portion 21 installed to penetrate to a rear side from a front side between two horizontal bars 11 and having the inflator 31 and the airbag cushion 32 fixed to the an internal space; an extended portion 22 bent to the outside from an end of a front side of the rear sealed portion 21; and a front extended portion 23 bent to a front side from the end of the extended portion 22 and coupled with the front bumper 40, and serving as a guide when the airbag cushion 30 is extended.

The horizontal bar 11 of the back beam 10 overlaps with a connection portion of the rear sealed portion 21 and the extended portion 22 to be coupled by welding in the energy absorber 20.

Accordingly, since the present invention has a structure in which the energy absorber 20 is coupled to the back beam 10 by welding, rigidity of the back beam 10 may be significantly improved, and as a result, a low-speed collision performance by the back beam 10 may be significantly improved.

In addition, a plurality of coupling holes 24 are formed at an end of a front opening portion 23 in the energy absorber 20 and a plurality of hook protrusions 41 that are fixed with being hung on the front opening portion 23 by penetrating the coupling holes 24, respectively integrally protrude on an inner surface of the front bumper 40. One will appreciate that the hook protrusions may be monolithically formed with the front bumper.

The hook protrusion 41 is elastically transformed by external force so that the hook protrusion 41 is easily inserted into the coupling hole 24.

In addition, the energy absorber 20 may be made of steel in order to provide increased rigidity.

That is, in the present invention, when the exterior airbag 30 is actuated, the airbag cushion 32 is extended by being guided by the front opening portion 23 and during this process, the airbag cushion 32 is extended while protruding forward by tearing the front bumper 40.

Therefore, since the energy absorber 20 of the present invention is torn by the extended airbag cushion 32, the energy absorber 20 needs not necessarily be made of plastic which has small rigidity and a phenomenon in which the energy absorber 20 is manufactured by steel which is large rigidity and is easily collapsed when an accident occurs is prevented and furthermore, collision energy may be sufficiently absorbed.

In addition, since the present invention has a structure in which the airbag cushion 32 protrudes forward while tearing only the front bumper 40, the extension performance of the airbag cushion 32 may be significantly improved without an increase in capacity of the inflator and an increase in cost.

As described above, in the front body structure according to the present invention, the back beam 1 takes charge of a low-speed collision, the exterior airbag 30 takes charge of a high-speed collision, and the lower stiffener 60 takes charge of walker protection.

Further, as the energy absorber 20 is integrally coupled to the back beam 10, the rigidity of the back beam 10 may be significantly improved, and as a result, the low-speed collision performance using the back beam 10 may be significantly improved.

In addition, since the present invention has a structure in which the airbag cushion 32 protrudes forward while tearing only the front bumper 40, the extension performance of the airbag cushion 32 may be significantly improved without the increase in capacity of the inflator and the increase in cost.

Further, in the present invention, as the energy absorber 20 is made of steel, the rigidity of the energy absorber 20 may be improved, and as a result, the phenomenon in which the energy absorber 20 is easily collapsed may be prevented when the accident occurs, thereby sufficiently absorbing the collision energy.

In addition, according to the present invention, the walker may be protected by using the lower stiffener 60.

According to the front body structure of the vehicle of the present invention, the low-speed collision performance can be significantly improved as the rigidity of the back beam can be significantly improved, the extension performance of the airbag cushion can be significantly improved as the airbag cushion is extended to protrude forward while tearing only the front bumper, and the collision energy when the accident occurs can be significantly absorbed as the energy absorber is made of steel to improve rigidity thereof.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front body structure of a vehicle, comprising:
   an energy absorber formed by a cross section of which a front side is opened and a rear side is sealed, and installed with the sealed rear side coupled to a back beam, wherein the opened front side protrudes forwardly;
   an exterior airbag fixedly installed by being coupled with the energy absorber with being inserted into the energy absorber; and
   a front bumper coupled with the energy absorber while being positioned in front of the exterior airbag to cover a front side of the exterior airbag;
   wherein the back beam is a tubular back beam comprising two horizontal bars vertically spaced from each other and a plurality of vertical bars connecting the two horizontal bars.

2. The front body structure of a vehicle of claim 1, further comprising:
   a plurality of mounting brackets coupled to left and right sides of the back beam to protrude downward; and
   a lower stiffener installed horizontally to connect the mounting bracket to protect a walker.

3. The front body structure of a vehicle of claim 1, wherein the energy absorber is made of steel.

4. The front body structure of a vehicle of claim 1, wherein the energy absorber comprises a rear sealed portion installed to penetrate to a rear side from a front side between the two horizontal bars and having an inflator and an airbag cushion fixed to the an internal space, an extended portion bent toward and exterior from an end of a front side of the rear sealed portion, and a front opening portion bent to a front side from the end of the extended portion and coupled with the front bumper, and serving as a guide when the airbag cushion is extended.

5. The front body structure of a vehicle of claim 4, wherein the horizontal bars of the back beam are welded to a connection portion of the rear sealed portion and the extended portion.

6. The front body structure of a vehicle of claim 4, wherein a plurality of coupling holes are formed at an end of the front opening portion, and a plurality of hook protrusions that are fixed with being hung on the front opening portion by penetrating the coupling holes, respectively integrally protrude on an inner surface of the front bumper.

\* \* \* \* \*